United States Patent
Van Der Burg

(10) Patent No.: US 12,006,646 B2
(45) Date of Patent: Jun. 11, 2024

(54) FENDER

(71) Applicant: Shipyard Rotterdam B.V., Rotterdam (NL)

(72) Inventor: Gerrit Van Der Burg, Rotterdam (NL)

(73) Assignee: SHIPYARD ROTTERDAM B.V., Rotterdam (NL)

( * ) Notice: Subject to any disclaimer, the term of this patent is extended or adjusted under 35 U.S.C. 154(b) by 876 days.

(21) Appl. No.: 16/978,316

(22) PCT Filed: Mar. 6, 2019

(86) PCT No.: PCT/NL2019/050139
§ 371 (c)(1),
(2) Date: Sep. 4, 2020

(87) PCT Pub. No.: WO2019/172754
PCT Pub. Date: Sep. 12, 2019

(65) Prior Publication Data
US 2021/0002840 A1 Jan. 7, 2021

(30) Foreign Application Priority Data
Mar. 6, 2018 (NL) .................................... 2020540

(51) Int. Cl.
*E02B 3/26* (2006.01)
*B63B 21/02* (2006.01)
(Continued)

(52) U.S. Cl.
CPC ................ *E02B 3/26* (2013.01); *B63B 21/02* (2013.01); *F16F 9/065* (2013.01); *F16F 15/023* (2013.01);
(Continued)

(58) Field of Classification Search
CPC .......... E02B 3/26; B63B 21/02; F16F 15/023; F16F 15/0275; F16F 2222/12;
(Continued)

(56) References Cited

U.S. PATENT DOCUMENTS 2,039,151 A 4/1936 Dubois
3,854,706 A 12/1974 Johnston
(Continued)

FOREIGN PATENT DOCUMENTS

CN 203066030 U 7/2013
CN 106012977 A 10/2016
(Continued)

OTHER PUBLICATIONS

International Search Report dated Jul. 12, 2019 issued in corresponding International Patent Application No. PCT/NL2019/050139 (3 pgs.).
(Continued)

*Primary Examiner* — Kyle Armstrong
(74) *Attorney, Agent, or Firm* — Pillsbury Winthrop Shaw Pittman, LLP

(57) ABSTRACT

A fender for fending a ship from a mooring wall comprises a hydraulic cylinder and piston assembly arranged so that compression of the fender is translated into a force to move the piston in the cylinder. Valves couple the hydraulic cylinder to reservoir that is at least partially filled with gas. An overpressure valve allows hydraulic liquid to flow from the cylinder to the reservoir when the fender compression force exceeds a threshold, allowing the fender to be compressed. When the force drops away, a return valve allows hydraulic liquid to return to the cylinder, causing the piston to move to expand fender, following movement of the ship away from the fender. In this way oscillating motion is reduced. A plurality of such fenders may be combined with
(Continued)

mooring cable holding devices with a similar mechanism that pays out cable when the movement of the ship from the mooring wall cause the force on the mooring cable to grow. Energy generated from such forces may be used to reduce movement of the ship.

8 Claims, 5 Drawing Sheets

(51) Int. Cl.
*F16F 9/06* (2006.01)
*F16F 15/023* (2006.01)
*F16F 15/027* (2006.01)
*H01F 7/20* (2006.01)
*H02K 7/18* (2006.01)
*H02K 11/00* (2016.01)

(52) U.S. Cl.
CPC ............ *F16F 15/0275* (2013.01); *H01F 7/20* (2013.01); *H02K 7/1853* (2013.01); *H02K 11/0094* (2013.01); *F16F 2222/12* (2013.01); *F16F 2228/066* (2013.01); *F16F 2230/18* (2013.01); *F16F 2232/08* (2013.01); *F16F 2236/04* (2013.01)

(58) Field of Classification Search
CPC ............ F16F 2228/066; F16F 2230/18; F16F 2232/08; F16F 2236/04; H02K 7/1853; H02K 11/0094
See application file for complete search history.

(56) References Cited

U.S. PATENT DOCUMENTS

| 4,137,861 A | 2/1979 | Brummenaes |
| 4,884,919 A | 12/1989 | Moore |

FOREIGN PATENT DOCUMENTS

| CN | 205875088 U | | 1/2017 | |
| CN | 106837673 A | | 6/2017 | |
| EP | 2923941 A1 | | 9/2015 | |
| GB | 1516104 | | 6/1978 | |
| JP | 2014-515814 A | | 7/2014 | |
| KR | 20170042104 A | * | 10/2015 | |
| SU | 881182 A1 | | 11/1981 | |
| WO | 01/62585 A1 | | 8/2001 | |
| WO | 2010/110666 A2 | | 9/2010 | |
| WO | 2012/156854 A2 | | 11/2012 | |
| WO | WO-2013164490 A1 | * | 11/2013 | ............... E02B 3/26 |
| WO | 2018/048303 A1 | | 3/2018 | |

OTHER PUBLICATIONS

Written Opinion of the International Searching Authority dated Jul. 12, 2019 issued in corresponding International Patent Application No. PCT/NL2019/050139 (6 pgs.).

* cited by examiner

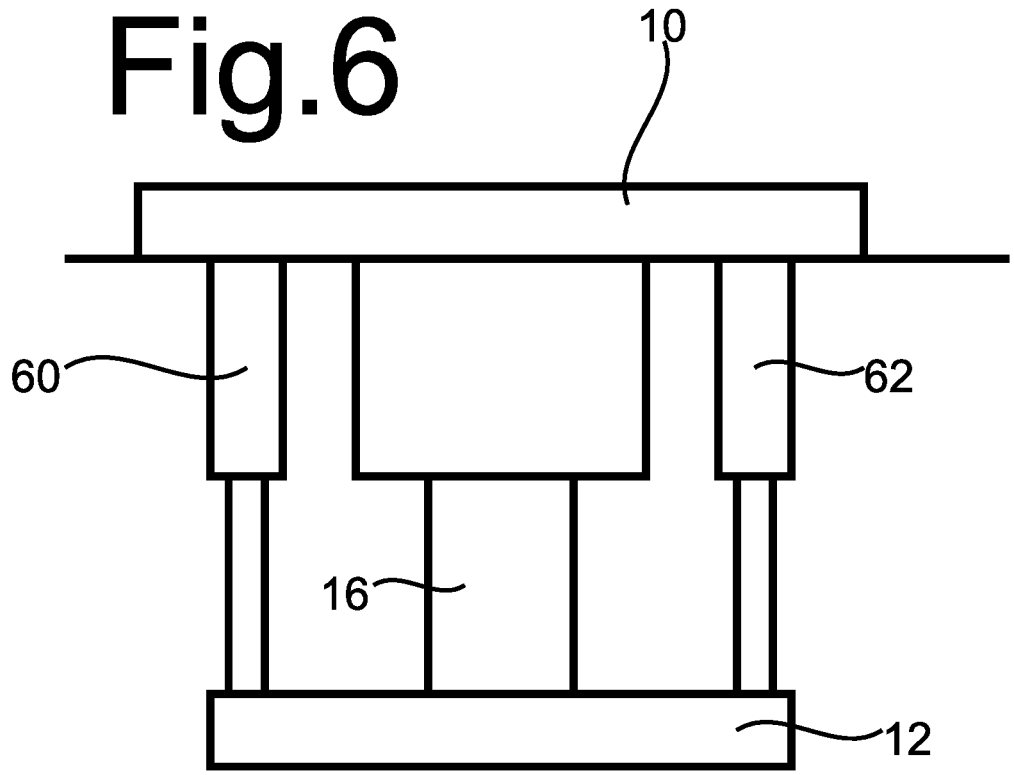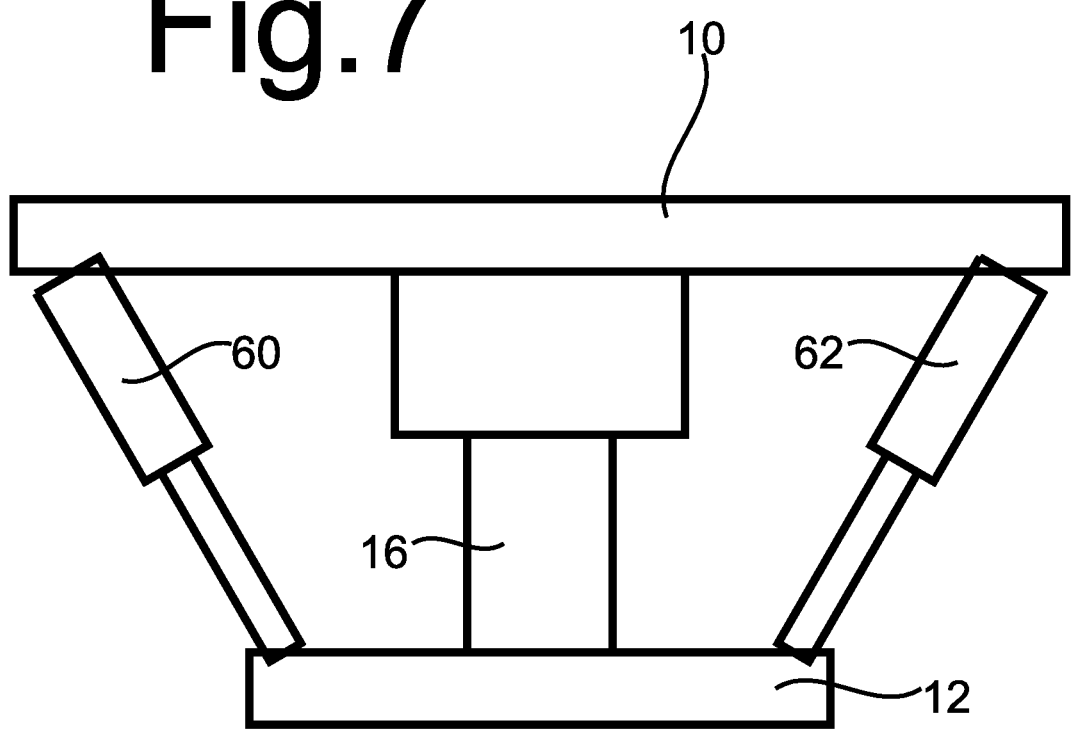

FENDER

CROSS-REFERENCE TO RELATED APPLICATIONS

This application claims priority to PCT/NL2019/050139, filed Mar. 6, 2019, which further claims priority to NL 2020540, filed Mar. 6, 2018, the contents of both of which are hereby incorporated by reference in their entireties.

The invention relates to a fender, such as for use to on a mooring wall to space a moored ship from the mooring wall.

BACKGROUND

Fenders on mooring walls (e.g. quay sides, docks, posts) are well known. The fender provides a reaction force on the side of a ship that is moored along the mooring wall, in response to the force by which the ship urged against the mooring wall as long as the side as the ship is in contact with the fender.

However, under some circumstances, the reaction force can give rise to an undesirable oscillating motion of the ship, due to the interplay between forces exerted by the mooring cables and the fenders: when the ship has motion that brings it into contact with the fenders along the mooring wall, the fenders make the ship bounce off, causing a motion away from the mooring wall, which in turn elicits forces from the mooring cables that will eventually cause ship motion back towards the mooring wall, so that the fenders will bounce off the ship again and so on.

When the ship is moored using mooring cable holding devices as described in WO2010/110666 and WO 2018/048303, and the fender bounces off the ship, the mooring cable holding devices will initially respond to the bounce off by paying out slack on the mooring cables when the fenders force the ship off the mooring wall and subsequently put a force on the mooring cables to haul in the ship back in, thereby creating ship motion back towards the mooring wall that can lead to oscillating motion.

SUMMARY

Among others, it is an object to reduce motion of a ship that is moored along a mooring wall with one or more fenders.

A fender for fending a ship from a flooring wall is provided that comprises a hydraulic cylinder and piston assembly arranged so that compression of the fender will cause the piston to exert a force to compress hydraulic liquid in the further hydraulic cylinder. Valves couple the hydraulic cylinder to reservoir that is at least partially filled with gas. An overpressure valve allows hydraulic liquid to flow from the cylinder to the reservoir when the fender compression force exceeds a threshold, allowing the fender to be compressed. When the force drops away, a return valve allows hydraulic liquid to return to the cylinder, causing the piston to move to expand fender, following movement of the ship away from the fender. In an embodiment a fender according to claim 1 is provided.

The fender makes it possible to reduce oscillating motion of the ship. A plurality of such fenders located along a mooring wall of a mooring berth for a ship may be used In an embodiment the fender comprises an electromagnet with poles configured to generate a magnetic filed to attract a ship towards the movable fender surface, preferably at a time when the ship has a motion away from the mooring wall. In this way the fender can reduce this motion In an embodiment the fender comprises an electric generator configured to generate electricity driven by movement of the movable fender surface toward the fender base structure and an electric energy storage device coupled to the electric generator for storing electric energy generated by the electric generator a switch coupled between electric energy storage device and the electromagnet. In an embodiment the fender comprises a control mechanism to make the switch conductive at least part of the time when the movable fender surface moves away from the fender base structure and/or has stopped moving away from the fender base structure. Thus the makes the switch conduct current at a time when the ship has a motion away from the mooring wall.

A mooring system is provided that comprises a plurality of fenders according to any one of the preceding claims, located along a mooring wall of a mooring berth for a ship, and at least one cable holding device located on the mooring wall aside the mooring berth, the cable holding device comprising
  a further hydraulic cylinder and piston assembly, for coupling a mooring cable of a ship to the mooring wall, so that tension on the mooring cable will cause the piston to exert a force to compress hydraulic liquid in the further hydraulic cylinder;
  a further reservoir filled at least partially with gas;
  a further overpressure valve configured to pass the hydraulic liquid from the further hydraulic cylinder to the further reservoir when a difference between a pressure of the hydraulic liquid in the further hydraulic cylinder and a pressure in the further reservoir reaches a further first threshold;
  a further return valve configured to pass hydraulic liquid from the further reservoir to the further hydraulic cylinder when a difference between a pressure of the hydraulic liquid in the further hydraulic cylinder drops below a further second threshold lower than the further first threshold.

In an embodiment such a mooring system may have means for transferring energy generated in the cable holding device to at least one of the plurality of fenders.

In an embodiment of such a mooring system, said means are configured to generate electric power, said at least one of the plurality of fenders are configured to use said electric energy to generate a force on the ship to reduce motion of the ship.

A plurality of such fenders may be combined with flooring cable holding devices with a similar hydraulic mechanism as in the fender that pays out cable when the movement of the ship from the mooring wall cause the force on the mooring cable to grow. In a further embodiment energy generated from such forces may be used to reduce movement of the ship.

BRIEF DESCRIPTION OF THE DRAWING

These and other objects and advantages will become apparent from a description of exemplary embodiments, with reference to the following FIGURES
  FIG. 1 schematically shows a fender
FIGS. 6 and 7 show embodiments of the fender with adjustable force adjustment devices.

DETAILED DESCRIPTION OF EXEMPLARY EMBODIMENTS

Figure 1:
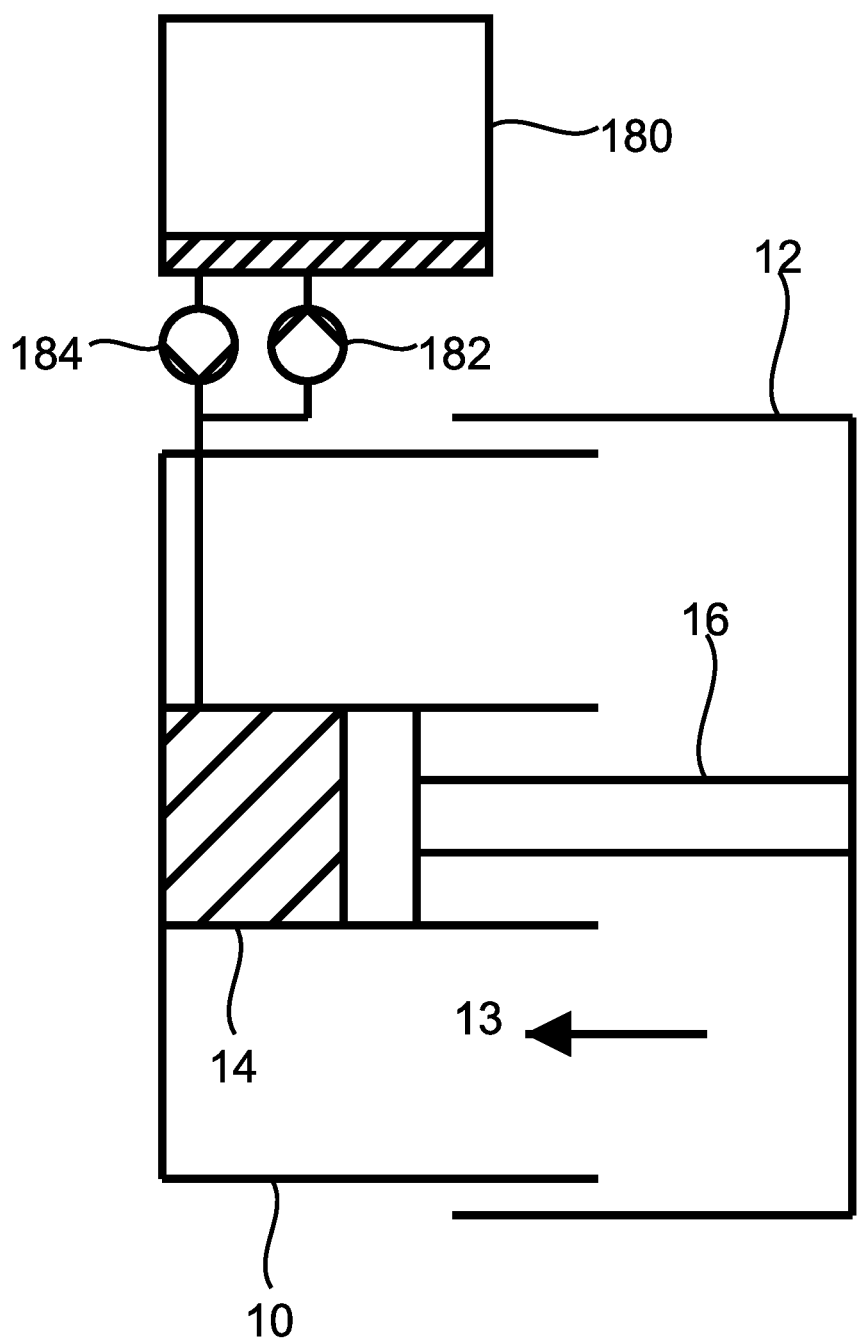

FIG. 1 schematically shows a fender for use on the mooring wall to buffer forces between a moored ship and the mooring walls. The mooring wall may be a mooring wall, or a line of posts in the water. The mooring wall may comprise a plurality of such fenders at regular distances along the mooring walls. Although not shown, it should be understood that the fender may contain additional structures like resilient elements between different components.

The fender comprises a fender base structure 10, a movable fender surface 12 mounted moveable in a fender compression direction 13 towards fender base structure 10, a hydraulic cylinder 14 and a piston 16 in hydraulic cylinder 14. In the illustrated embodiment, hydraulic cylinder 14 is fixed to fender base structure 10 and piston 16 is mechanically coupled to movable fender surface 12, so that forces are transmitted between movable fender surface 12 and piston 16. Alternatively, piston 16 may be fixed to fender base structure 10 and hydraulic cylinder 14 may be coupled to movable fender surface 12, so that forces are transmitted between movable fender surface 12 and hydraulic cylinder 14. Fender base structure 10 may be mounted along the mooring wall or other fixed structure, so that the fender will lie between the fixe structure and a moored ship.

Furthermore, the fender comprises a hydraulic circuit, which comprises an overpressure protection part, comprising a reservoir 180, an overpressure valve 182, and a one way valve 184. The end of hydraulic cylinder 14 towards which piston 16 presses the hydraulic liquid when movable fender surface 12 is pressed towards fender base structure 10 is coupled to the bottom of reservoir 180 in parallel via overpressure valve 182 and one way valve 184. Reservoir 180 contains hydraulic liquid at the bottom and compressed gas at the top. Overpressure valve 182 is configured to allow flow of hydraulic liquid from hydraulic cylinder 14 to reservoir 180 when the pressure in hydraulic cylinder 14 exceeds the pressure in reservoir 180 by a predetermined first threshold. One way valve 184 is configured to allow flow of hydraulic liquid from reservoir 180 to hydraulic cylinder 14 when the pressure in reservoir 180 is higher than the pressure in hydraulic cylinder 14, or more generally when the pressure in reservoir 180 is more than a second threshold higher than the pressure in hydraulic cylinder 14. Preferably the second threshold of one way valve 184 is set so small that . . . .

In operation, when a ship moves into contact with movable fender surface 12, movable fender surface 12 transmits a force in the fender compression direction, i.e. in the direction of the mooring wall, to fender base structure via hydraulic cylinder 14, and thereby to the mooring wall.

Figure 2:
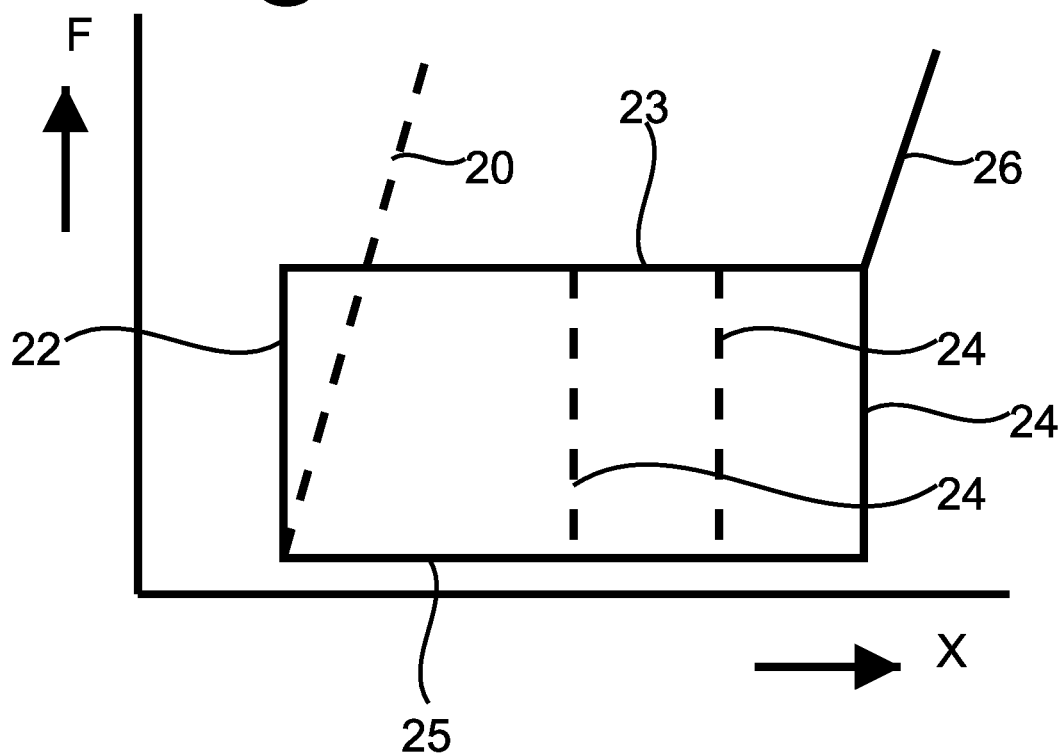
FIG. 2 illustrates the force-position relation of a fender surface

FIG. 2 illustrates the relation between the force exerted by movable fender surface 12 and its position. Vertical line 22 indicates the part of the force-position relation for the fender of FIG. 1 that corresponds to the situation that the force exerted by the ship on movable fender surface 12 does not cause the pressure in hydraulic cylinder 14 to exceed the pressure needed to open overpressure valve 182. Horizontal line 23 indicates the part of the force-position relation when the force towards the mooring wall becomes so large that overpressure valve 182 opens to allow hydraulic liquid to flow from hydraulic cylinder 14 to reservoir 180.

Vertical line 22 shows that movable fender surface 12 acts like a fixed wall, as long as the force exerted by the ship on movable fender surface 12 does not cause the pressure in hydraulic cylinder 14 to exceed the pressure needed to open overpressure valve 182. The fender matches the force exerted by the ship and does not change position.

Horizontal line 23 shows that the fender is compressed once the force exerted by the ship cause the pressure in hydraulic cylinder 14 to exceed the pressure needed to open overpressure valve 182. In that case, the amount of hydraulic liquid in hydraulic cylinder 14 decreases allowing movable fender surface 12 to move towards the mooring wall, while the force exerted by movable fender surface 12 on the ship remains constant.

Thus, when the ship moves into contact with the wall and exerts sufficient force, the reaction force exerted by the fender is limited. This should be contrasted with the behavior of a perfectly stiff or resilient fender. For reference, the force-position relation for a resilient fender is indicated by a dashed line 20 (For a perfectly stiff fender this line would be vertical). This force-position relation differs from the relation shown by vertical line 22 and horizontal line 23 in that the force exerted by the fender on the ship can become much larger, so that once movement of the ship is stopped, the fender will be continue to exert a force that bounces of the ship.

However, when the fender permits movement of the ship at a constants reaction force, as shown by horizontal line 23, the force exerted by the ship will normally drop after moving over some distance, without exerting a force to bounce off the ship. The force exerted by the ship will normally drop e.g. because force exerted by the mooring cables will decrease as the ship moves towards the mooring wall, and because the force exerted by the fender causes the ship to slow down. When the force exerted by the ship drops below force needed to open the overpressure valve 182. Once that happens, the position of movable fender surface 12 will remain constant and the force exerted by movable fender surface 12 will drop until one way valve 184 opens.

Vertical lines 24 show this behavior. A plurality of vertical lines 24 is shown, because the position of movable fender surface 12 where the force drop-off occurs may be different, dependent on the circumstance of movement the ship. If, abnormally, the ship would keep on moving towards the mooring wall, movable fender surface 12 eventually will come to a standstill when movable fender surface 12 and/or piston 16 reaches a stop structure (not shown), after which the force exerted by movable fender would surface 12 would increase rapidly just like a resilient or stiff fender, as shown by (near) vertical line 26. In this case the ship would bounce off.

Horizontal line 25 shows the position force relation when the force exerted by the ship is so low that one way valve 184 is open. In this case the hydraulic liquid returns from reservoir 180 to hydraulic cylinder 14 until movable fender surface 12 has moved back to the position of vertical line 22.

In operation, prior to use, hydraulic liquid is pumped into or out off hydraulic cylinder 14, to set it at a desired initial position, e.g. with movable fender surface 12 nearly as far as possible from the mooring wall, or as far as possible and at a hydraulic pressure so that less than a predetermined force is needed to compress the fender Both may be done using a priming unit (not shown), as described in WO2010/110666 or as described in WO 2018/048303, which are incorporated by way of reference. The priming unit may comprise a pump, a valve and an auxiliary reservoir with hydraulic liquid, the pump and the valve being coupled in parallel between the auxiliary reservoir and the cylinder 14. The priming unit may be part of the fender. Alternatively, a vehicle comprising a mobile priming unit may be used that can be driven to a plurality of fenders, to prime each of these fenders.

As noted, the fender may comprise additional elements. In an embodiment, one or more resilient elements are used between the combination of the piston and hydraulic cylinder on one hand and movable fender surface 12 on the other hand, and/or between this combination and the fender base structure. The resilient element may be rubber structures, springs or hydraulic spring for example. Such resilient elements have the effect of changing vertical line 22 into an oblique line, i.e. they allow for displacement of movable fender surface 12 even before the force is sufficient to cause opening of overpressure valve 182. Similarly, vertical line 26 will become more oblique. In relation to the ship, they allow for a larger range of movement and for a more gradual increase of the force when the ship comes into contact with the fender and when the fender reaches its stop.

Figure 3:
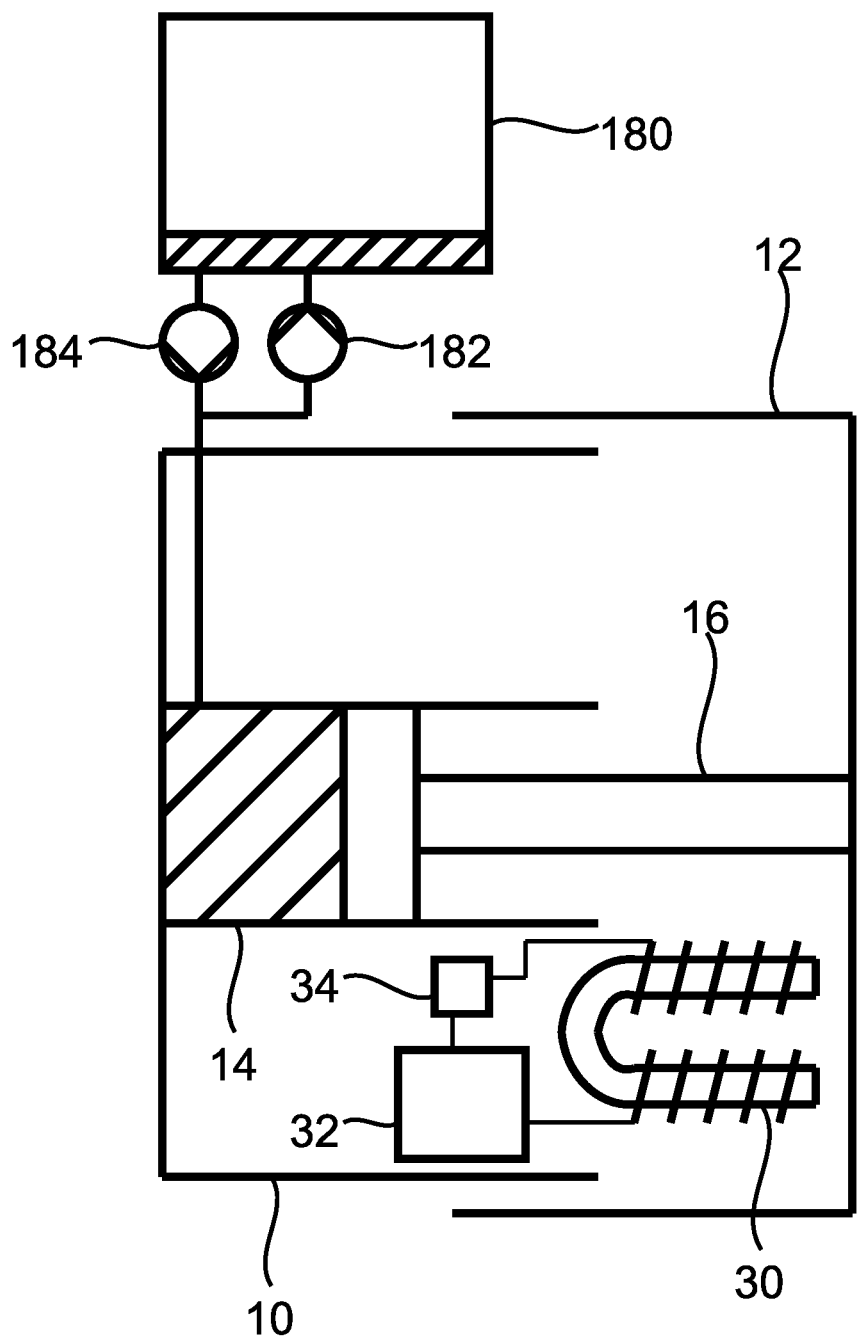
FIG. 3 shows an embodiment of a fender

FIG. 3 schematically shows a further embodiment of the fender. In this embodiment, the fender comprises one or more electromagnets 30 (only one shown) attached to the inside of movable fender surface 12, an optional electric energy storage device 32 such as a capacitor or an accumulator, and a switch 34. The opposite magnetic poles of electromagnet 30 may be located at different positions on movable fender surface 12. In an embodiment movable fender surface 12 may have openings at the locations of at least one of the magnetic poles of electromagnet 30. Preferably, movable fender surface 12 is of a non-ferromagnetic material. Although electromagnet 30 is shown as a horseshoe of for the sake of illustration, wherein the horse shoe is of soft magnetic material, it should be appreciated that any form of magnet may be used. Preferably, both poles of the electromagnet are located substantially in the same plane as movable fender surface 12. For example a soft magnetic return structure may be included between this plane and one or both of the poles.

In operation electromagnet 30 or a plurality of electromagnets may be used to generate an additional force acting to try and keep the ship in contact with movable fender surface 12. This further reduces the amount of bouncing movement. Current may be supplied through electromagnet 30 for example when one way valve 184 is open, i.e. at force-position combinations corresponding to horizontal line 25. In an embodiment, a mechanical connection between one way valve 184 and switch 34 may be used to do so.

In another embodiment or a further embodiment, the supply of current through electromagnet 30 may be (further) limited to a range of positions of movable fender surface 12. For this purpose, switch 34 or a further switch in series with switch 34 may be configured to switch when movable fender surface 12 or piston 16 passes through predetermined positions. Alternatively, the fender may comprise a microcomputer or a remote control unit to control switching.

The control mechanism of switch 34 may be configured to make switch 34 conductive when movable fender surface 12 moves away from the fender base structure and/or has stopped moving away from the fender base structure.

The energy required for supplying current through the one or more electromagnets 30 may be supplied from an external source. But in an embodiment it may be harvested from movements of the ship that contacts the fender. The ship moves due to wind forces and wave forces. When present, energy can be harvested from such sources, when absent no energy to provide special holding forces is needed. In one embodiment, forces exerted on a mooring cable of the ship are used to generate electricity and the generated electricity is supplied directly to electromagnet 30 or temporarily stored in electric energy storage device 32 before supply to electromagnet 30. It should be noted that energy storage device 32 may be dispensed with, because the mooring cable device generates electricity mainly at the same time when the fender expands, so that the generate energy can be used directly without storage. However, storage device may be useful to shift the time at which the fender exerts the force.

An energy harvesting device in a connection between the mooring cable and the shore may be used. Such a device may include an electric generator and be configured to pay out mooring cable length when the ship exerts a force away from the shore and to pull the mooring cable back in when the force drops, resulting in net energy absorption by the device. As may be noted, this provides energy at substantially the same time when the magnet in the fender needs energy to hold on to the ship.

Any suitable cable driven energy harvesting device may be used, e.g. using a hydraulic system to pay out and pull in the mooring cable with a generator driven by flow of the hydraulic liquid in hydraulic system. Another example is use of a generator coupled to a rotating drum from which the mooring cable is wound off forced by the ship when the ship is forced away from the shore and wound back on when this force decreases.

Figure 4:
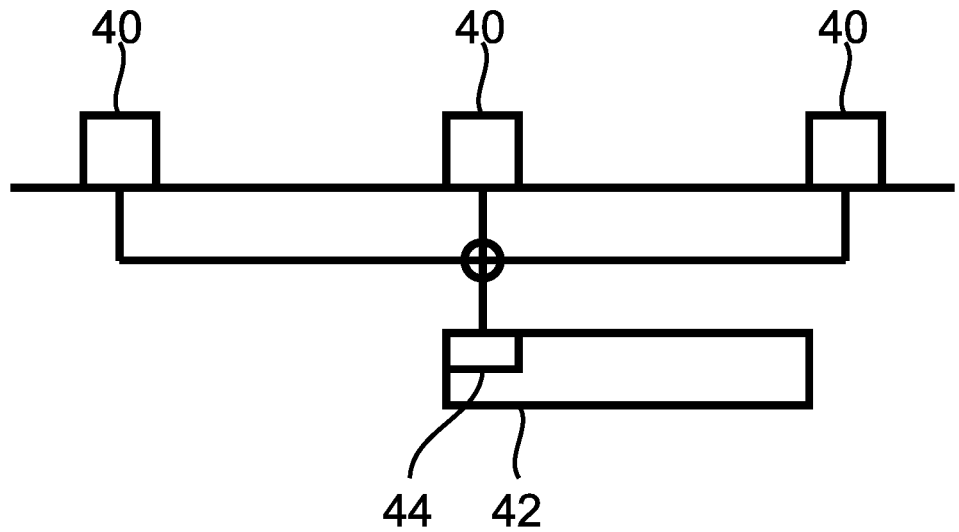
FIG. 4 shows a mooring system

FIG. 4 shows a mooring system comprising a plurality of fenders 40 of the type shown in FIG. 3 and at least one cable holding device 42. Cable holding device 42 may be configured to operate as described in WO2010/110666 or WO 2018/048303, using a similar configuration of a hydraulic cylinder, piston, reservoir, overpressure valve, and one way valve as in FIG. 1 of this application. This device has been modified by adding a hydraulic flow driven electric generator 44 in the conduit from the hydraulic cylinder to the reservoir, in series with the overpressure valve and/or the one way valve to drive the electric generator.

Alternatively, or in addition, the fender itself may comprise an energy harvesting device to generate electric energy coupled to for use to supply current to electric energy storage device 32 to store energy for supplying current to the electromagnet. A hydraulic flow driven electric generator may be added in the conduit from the hydraulic cylinder to the reservoir in the fender, in series with the overpressure valve. Thus electric energy can be harvested when the ship compresses the fender and used to pull the ship towards the fender when the ship moves away afterwards.

An additional effect of a magnetic clamping force is that it increases friction forces (e.g. stick slip) between the fender and the ship's wall, in opposition to longitudinal forces. In turn, this friction force may reduce the force demanded from the mooring cable holding device to oppose the longitudinal force.

In an embodiment the fender comprises a wireless transmitter and/or receiver and a position and/or pressure sensing arrangement. The pressure sensing arrangement may one or more pressure gauges in the hydraulic circuit, e.g. in the hydraulic cylinder. The position sensing arrangement may comprise one or more markers, e.g. magnetic markers, on the movable part of the fender and position sensor on the fender base structure or vice versa, or on piston rod and a position sensor on or outside main cylinder 12 or vive versa, to sense a marker when it moves past the sensor.

A (programmed) logic circuit or a microcomputer may be provided coupled to the wireless transmitter and the position sensor and/or the pressure indicators. A microcomputer may have program with instructions to receive data from the position sensor and/or the pressure indicators and to cause the wireless transmitter to transmit information derived from this data, or to evaluate the data to detect whether the data meets a predetermined condition for generating a signal and to cause the wireless transmitter to transmit a message if the condition is met. The condition may be that the data indicates that the main piston has remained in an extreme range of positions for at least a predetermined duration of time. The transmitted messages may be received for display in a control room for example.

Figure 5:
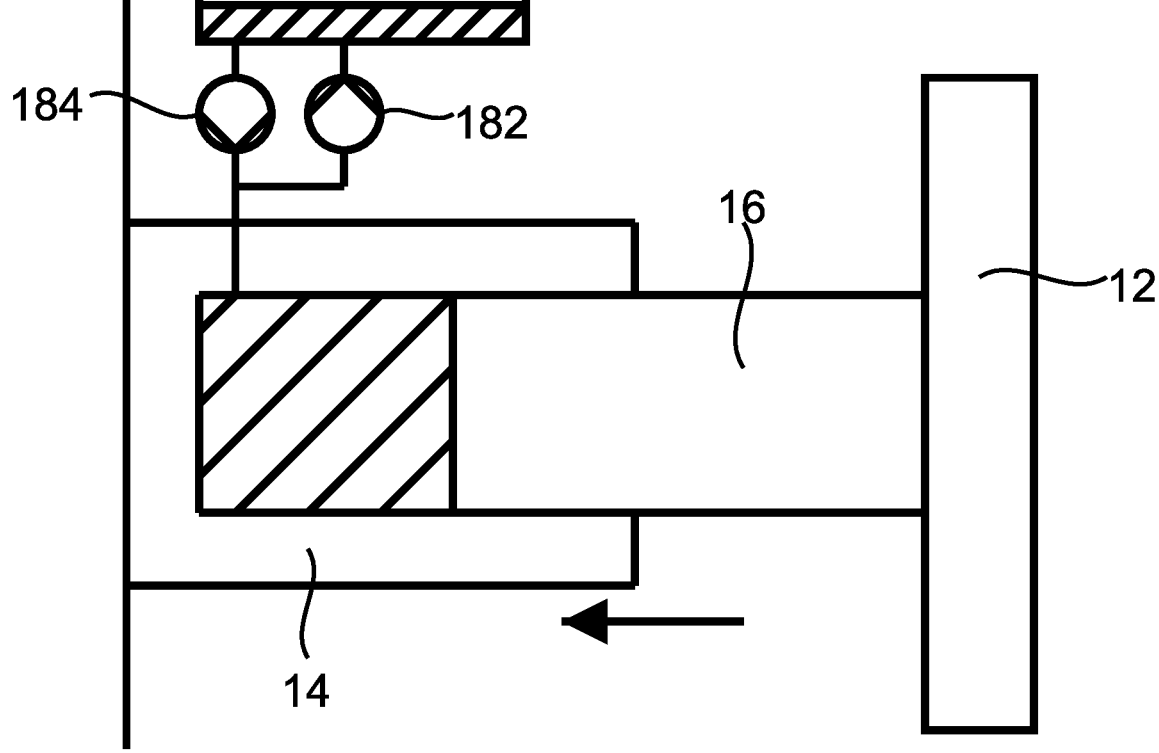
FIG. 5 shows an embodiment of a fender

FIG. 5 shows an embodiment of the fender wherein piston 16 has an outer diameter equal to the inner diameter of cylinder 14, over the entire length of piston 16. A plate or block 12 on piston 16 may serve to provide the fender surface.

FIG. 6 shows an embodiment wherein the fender comprises a first and second adjustable force adjustment devices 60, 62 coupled between the surface 12 of the fender and its base structure 10 (e.g. the quay). This embodiment is illustrated with the embodiment of FIG. 5, but force adjustment devices 60, 62 may also be used in combination with the other embodiments. Force adjustment devices 60, 62 may comprise a hydraulic piston-cylinder combination configured to exert an adjustable force that pulls surface 12 towards the shore (e.g. a pretension force) and/or pushes surface 12 from the shore. In another embodiment force adjustment devices 60, 62 may comprise adjustable springs and/or cables attached to one or more devices (not shown) to pull surface 12 towards the shore with an adjustable force.

The fender comprises means for dynamically varying a force exerted by the force adjustment devices during movement of the ship. Adjustable force adjustment devices 60, 62 serve to apply a force to dynamically vary an amount of force applied by force adjustment devices 60, 62. The dynamic variation may be used to increase the amount of energy absorbed from movement the ship.

At different times the fender can absorb and impart energy from and to movement of the ship. As long as the fender surface is in contact with the ship, the energy transfer rate can be expressed as v*F, where v is the speed of movement of the fender surface and F is the force exerted by the fender on the ship.

For example, during oscillatory movement of the ship, the speed v periodically changes sign as the fender alternated is compressed inward and veers outward. Energy is absorbed when the fender moves inward (v<0) and energy is imparted when the fender moves outward (v>0). By increasing and reducing the force during a period of oscillatory movement of the ship, force adjustment devices 60, 62 may be used to reduce and increase the reaction force F exerted by the fender respectively during such a period, and thereby to increase the net absorption of energy from the oscillatory movement. When the force variation has a spectral frequency component at the frequency of oscillatory movement of the ship and that has a phase component opposite to the phase of the oscillatory speed variation of the ship, net energy is absorbed.

Preferably, force adjustment devices 60, 62 are configured to exert the same force. Instead of two force adjustment devices 60, 62 a single force adjustment device or more than two force adjustment devices may be used.

FIG. 7 illustrates an embodiment wherein first and second adjustable force adjustment devices 60, 62 are coupled between the surface 12 of the fender and its base structure 10 along lines that make a non-zero angle with the direction of movement of cylinder 16 (e.g. an angle between 20 and 70 degrees and preferably about forty five degrees). In this way force adjustment devices 60, 62 also serve to stabilize the fender against later movement, e.g. due movement of the ship in a direction lateral to the direction of movement of cylinder 16. Preferably, the angles of both force adjustment devices 60, 62 are the same but in opposite directions relative to the direction of movement of piston 16.

In an embodiment, a logic circuit or a microcomputer may be provided coupled to the force adjustment devices. Such a logic circuit or microcomputer, may be configured to vary the force exerted by the force adjustment devices dynamically, e.g. dependent on measurement of swell conditions, which make it possible to predict the forces that will be exerted on the fender and/or the response of the ship to forces exerted by the fender or the force adjustment device(s).

The invention claimed is:

1. A fender for fending a ship from a mooring wall, the fender comprising
  a fender base structure;
  a movable fender surface mounted moveable in a fender compression direction relative to the fender base structure;
  a hydraulic cylinder and piston assembly operationally connected between the fender base structure and the movable fender surface;
  a reservoir filled at least partially with gas;
  an overpressure valve configured to pass hydraulic liquid from the hydraulic cylinder to the reservoir when a difference between a pressure of the hydraulic liquid in the hydraulic cylinder and a pressure in the reservoir reaches a first threshold;
  a return valve configured to pass hydraulic liquid from the reservoir to the hydraulic cylinder when a difference between a pressure of the hydraulic liquid in the hydraulic cylinder drops below a second threshold lower than the first threshold;
  at least one force adjustment device coupled between the fender base structure and the movable fender surface; and
  a logic circuit or a microcomputer coupled to the at least one force adjustment device and configured for dynamically varying a force exerted by the at least one force adjustment device during oscillation periods of oscillatory movement of the ship, wherein the at least one force adjustment device is used to increase and reduce a reaction force exerted by the fender respectively during a period of oscillatory movement of the ship to increase the net absorption of energy from the oscillatory movement.

2. The fender according to claim 1, comprising an electromagnet with poles configured to generate a magnetic field to attract a ship towards the movable fender surface.

3. The fender according to claim 2, comprising:
  an electric generator configured to generate electricity driven by movement of the movable fender surface toward the fender base structure;
  an electric energy storage device coupled to the electric generator for storing electric energy generated by the electric generator; and
  a physical switch coupled between electric energy storage device and the electromagnet.

4. The fender according to claim 3, comprising a control mechanism to make the switch conductive at least part of the time when the movable fender surface moves away from the fender base structure and/or has stopped moving away from the fender base structure.

5. A mooring system, comprising a plurality of fenders, located along a mooring wall of a mooring berth for a ship, and at least one cable holding device located on the mooring wall aside the mooring berth, each fender comprising:
- a fender base structure;
- a movable fender surface mounted moveable in a fender compression direction relative to the fender base structure;
- a hydraulic cylinder and piston assembly operationally connected between the fender base structure and the movable fender surface;
- a reservoir filled at least partially with gas;
- an overpressure valve configured to pass hydraulic liquid from the hydraulic cylinder to the reservoir when a difference between a pressure of the hydraulic liquid in the hydraulic cylinder and a pressure in the reservoir reaches a first threshold;
- a return valve configured to pass hydraulic liquid from the reservoir to the hydraulic cylinder when a difference between a pressure of the hydraulic liquid in the hydraulic cylinder drops below a second threshold lower than the first threshold;
- at least one force adjustment device coupled between the fender base structure and the movable fender surface; and
- a logic circuit or a microcomputer coupled to the at least one force adjustment device and configured for dynamically varying a force exerted by the at least one force adjustment device during oscillation periods of oscillatory movement of the ship, wherein the at least one force adjustment device is used to increase and reduce a reaction force exerted by the fender respectively during a period of oscillatory movement of the ship to increase the net absorption of energy from the oscillatory movement;

the cable holding device comprising:
- a further hydraulic cylinder and piston assembly, for coupling a mooring cable of a ship to the mooring wall, so that tension on the mooring cable will cause the piston to exert a force to compress hydraulic liquid in the further hydraulic cylinder;
- a further reservoir filled at least partially with gas;
- a further overpressure valve configured to pass the hydraulic liquid from the further hydraulic cylinder to the further reservoir when a difference between a pressure of the hydraulic liquid in the further hydraulic cylinder and a pressure in the further reservoir reaches a further first threshold;
- a further return valve configured to pass hydraulic liquid from the further reservoir to the further hydraulic cylinder when a difference between a pressure of the hydraulic liquid in the further hydraulic cylinder drops below a further second threshold lower than the further first threshold.

6. The mooring system according to claim 5, comprising means for transferring energy generated in the cable holding device to at least one of the plurality of fenders.

7. The mooring system according to claim 6, wherein said means are configured to generate electric power, said at least one of the plurality of fenders being configured to use said electric energy to generate a force on the ship to reduce motion of the ship.

8. The mooring system according to claim 5, wherein the further hydraulic cylinder and piston assembly comprises an electric generator, the at least one of the fenders comprising an electromagnet with poles configured to generate a magnetic field to attract a ship towards the movable fender surface, the electric generator being coupled to the electromagnet to supply electric current to generate a magnetic field.

* * * * *